United States Patent
Sandstrom

(10) Patent No.: US 9,143,228 B2
(45) Date of Patent: Sep. 22, 2015

(54) OPTICAL COMMUNICATION DEVICES HAVING OPTICAL TIME DOMAIN REFLECTOMETERS

(71) Applicant: Leif J. Sandstrom, Madison, AL (US)

(72) Inventor: Leif J. Sandstrom, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 30 days.

(21) Appl. No.: 13/787,234

(22) Filed: Mar. 6, 2013

(65) Prior Publication Data

US 2013/0272694 A1 Oct. 17, 2013

Related U.S. Application Data

(60) Provisional application No. 61/607,372, filed on Mar. 6, 2012.

(51) Int. Cl.
  *H04B 10/071* (2013.01)
  *H04B 10/40* (2013.01)
  *H04B 10/25* (2013.01)

(52) U.S. Cl.
  CPC .......... *H04B 10/071* (2013.01); *H04B 10/2503* (2013.01); *H04B 10/40* (2013.01)

(58) Field of Classification Search
  CPC ............. H04B 10/071; H04B 10/0771; H04B 10/2503; H04B 10/40; H04B 2210/07; H04B 2210/078; G01M 11/3136; G01M 11/3145; H04Q 11/0067; H04Q 2011/0079
  USPC .......................................................... 398/21
  See application file for complete search history.

(56) References Cited

U.S. PATENT DOCUMENTS

| 7,684,699 | B2 | 3/2010 | Schmuck et al. |
| 2004/0081459 | A1 | 4/2004 | Mumm et al. |
| 2008/0019693 | A1 | 1/2008 | Sorin |
| 2010/0124418 | A1* | 5/2010 | Noble et al. ....................... 398/9 |
| 2011/0013904 | A1* | 1/2011 | Khermosh et al. ............... 398/16 |
| 2012/0020672 | A1* | 1/2012 | Aguren .......................... 398/139 |
| 2012/0082462 | A1* | 4/2012 | Mariotti et al. ............... 398/135 |

FOREIGN PATENT DOCUMENTS

| EP | 1884758 | 2/2008 |
| EP | 1884758 A1 | 6/2008 |

OTHER PUBLICATIONS

International Search Report issued by the Korean Intellectual Property Office as the International Searching Authority for International Application No. PCT/US2013/029399, entitled Optical Communication Devices Having Optical Time Domain Reflectometers; Byun, Sung Cheal (Jun. 4, 2013).

* cited by examiner

*Primary Examiner* — Leslie Pascal
(74) *Attorney, Agent, or Firm* — Maynard Cooper & Gale, P.C.; Jon E. Holland

(57) ABSTRACT

A small form factor pluggable (SFP) device has an embedded optical time domain reflectometer (OTDR) for detecting anomalies along an optical fiber. The SFP device has a plurality of optical subassemblies (OSAs) that are used to transmit an optical data signal at a first wavelength, transmit an optical OTDR signal at a second wavelength, and receive an optical data signal at a third wavelength. The OTDR signal is effectively isolated from the data signals based on wavelength, and samples of returns of the OTDR signal are analyzed to detect at least one anomaly along the optical fiber.

16 Claims, 4 Drawing Sheets

OPTICAL COMMUNICATION DEVICES HAVING OPTICAL TIME DOMAIN REFLECTOMETERS

CROSS REFERENCE TO RELATED APPLICATION

This application claims priority to U.S. Patent Application No. 61/607,372 entitled "Optical Networks Having Optical Time Domain Reflectometers Embedded in Small Form Factor Pluggables" and filed on Mar. 6, 2012, which is incorporated herein by reference.

RELATED ART

Small form factor pluggable (SFP) devices are often used as components of fiber networks as they often help to save space and reduce cost. Such SFP devices are typically coupled to electrical devices and used to convert signals between the electrical domain and the optical domain. As an example, an SFP device might convert an electrical signal to an optical signal by modulating a laser with data defined by the electrical signal. Such an optical signal may then be communicated through a passive optical network (PON) or other type of optical system. PONs often have relatively high data bandwidths making them attractive for use as a data transport backbone of a communication system. To ensure PON reliability, robustness, and performance, it is generally desirable to continuously monitor the health of the optical fibers in the PON.

One device used to monitor the health of PONs and other optical systems is an optical time domain reflectometer (OTDR), which is used to detect optical fiber anomalies. An OTDR injects an OTDR signal into the optical channel and captures and analyzes the "returns" produced as that signal propagates through the channel. Such returns are produced by scattering of light (Rayleigh backscatter) along the entire length of the fiber and, in some cases, by localized reflections (Fresnel reflections) at particular points along the fiber. At an anomaly, such as a degraded splice, more attenuation may occur as light passes through the splice, and in some cases more light may be reflected at this point than at other points that are free of anomalies. The OTDR measures the light returned from points along the length of the fiber to detect anomalies in the fiber system.

In many cases, the light used by an OTDR to probe an optical fiber for anomalies can interfere with the optical data signal transmitted through the fiber. Data services, therefore, may need to be suspended in order to perform the OTDR testing. Since interrupting data transmission is undesirable, techniques have been developed to permit the OTDR to operate simultaneously with data transmission. However, ensuring adequate isolation between the OTDR signal and the data signal can be problematic. This isolation problem becomes particularly challenging as the size of the transmit and receive subsystems connected to the optical channel are reduced, limiting the size of certain components, such as directional couplers and filters, typically used to isolate data signals and OTDR signals. Indeed, there exists a heretofore unaddressed need in the art for techniques and designs for embedding an OTDR in an SFP while achieving sufficient communication and testing performance, including, in particular, good isolation between the OTDR signal and the data signal.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to optical systems and methods for communicating data across an optical fiber while simultaneously probing the fiber for anomalies. In one exemplary embodiment, a communication device has an optical transceiver packaged as a small form factor pluggable (SFP) package and includes an embedded optical time domain reflectometer (OTDR). The SFP package has an optical subassembly (OSA) coupled to an optical fiber, and the OSA has two optical transmitters. One of the optical transmitters is configured to transmit a first data signal at a first wavelength through the optical fiber, and the other optical transmitter is configured to transmit an OTDR signal at a second wavelength through the optical fiber. The SFP package also has another OSA that is optically coupled to the optical fiber, and this other OSA has two optical receivers. One of the optical receivers is configured to receive a second data signal at a third wavelength from the optical fiber, and the other optical receiver is configured to receive returns from the optical fiber. In addition, the communication device comprises logic configured to define data indicative of at least one an anomaly along the optical fiber based on the returns.

Figure 1:
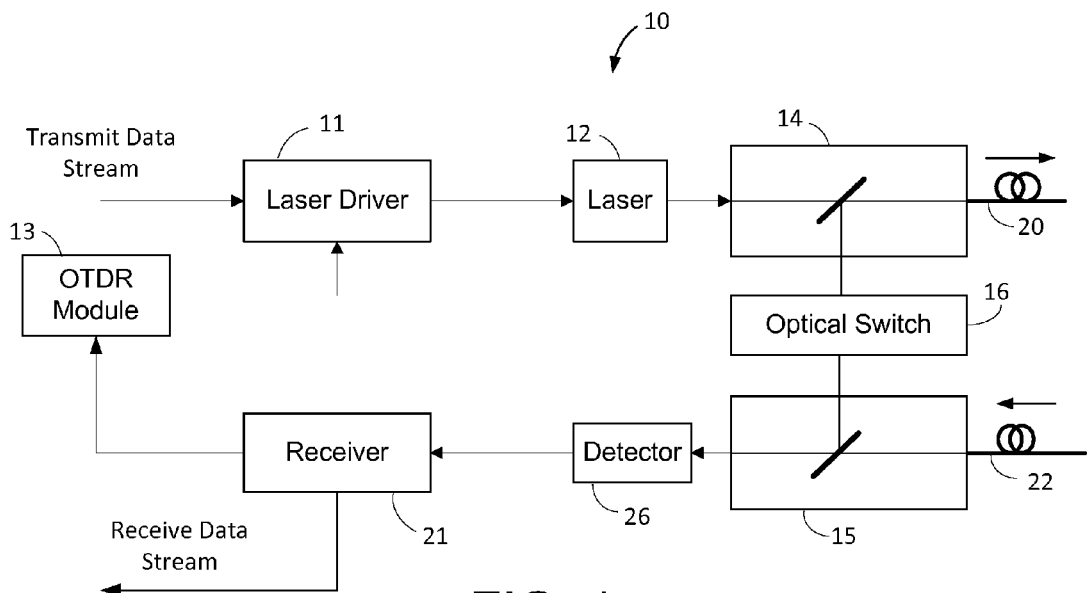
FIG. 1 is a block diagram illustrating a conventional transceiver having an embedded OTDR.

FIG. 1 depicts a conventional design for embedding an optical time domain reflectometer (OTDR) in a small form factor (SFP) device 10. Device 10 operates in two distinct modes: a communication mode and an optical time domain reflectometer (OTDR) mode. When in the OTDR mode, the device 10 does not communicate data but rather probes an optical fiber for anomalies, as will be described in more detail hereafter.

When operating in the communication mode, a laser driver 11 drives an optical transmitter, such as a laser 12, with a transmit data stream that is to be transmitted across an optical fiber 20 to a receiver (not shown) at an opposite end of the fiber 20. A laser 12 responds to the output of the laser driver 11 by converting the transmit data stream into an optical data signal (referred to hereafter as "transmit data signal") at a first wave length for transmission through the optical fiber 20. A portion of the transmit data signal is coupled to the optical fiber 20 through a coupler 14. During the communication mode, an optical switch 16 stops light propagation from coupler 14 from reaching a receiver coupler 15. Further, an optical data signal of a second wavelength (referred to hereafter as "receive data signal") transmitted to the device 10 from a far-end transmitter (not shown) is coupled to detector 26 from optical fiber 22 via receiver coupler 15. A data receiver 21 converts the output of the detector 26 to a data stream (referred to hereafter as "receive data stream").

When the device 10 operates in the OTDR mode, an OTDR module 13 provides an OTDR signal that modulates laser 12, and a resulting optical OTDR signal is coupled to the optical fiber 20. Reflections and backscatter (returns) at various points along the fiber 20 return to the coupler 14, and the switch 16 couples such returns so that they are received by the coupler 15 and detected by the detector 26. The returns of OTDR signal from detector 26 are processed by the OTDR module 13 to determine if there are anomalies in the fiber 20. When the device 10 is in the OTDR mode, the transmit data stream is not transmitted across the fiber 20, and the receive data stream is not received by the receiver 21. Hence, device 10 does not simultaneously transfer data and detect fiber anomalies. U.S. Patent Pub. No. 2012/0020672 describes a device similar to that shown by FIG. 1.

Figure 2:
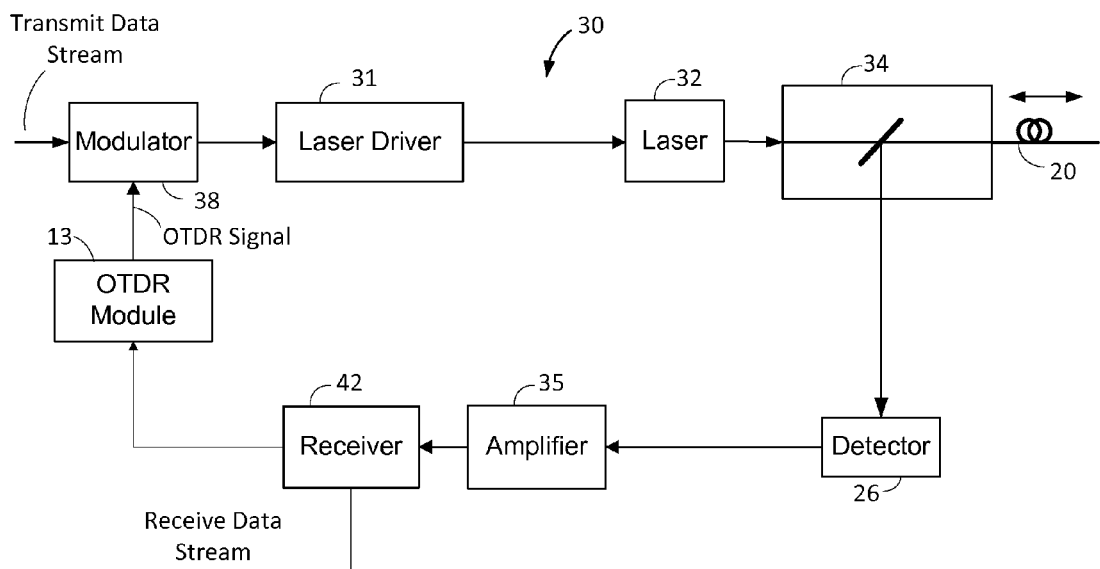
FIG. 2 is a block diagram illustrating another conventional transceiver having an embedded OTDR.

Another conventional SFP device 30 is depicted in FIG. 2. The device 30 of FIG. 2 is configured to simultaneously transfer data and detect anomalies in an optical fiber 20. Modulator 38 combines an OTDR signal with a first data stream providing a modulated data signal. Laser driver 31 applies the modulated data signal to laser 32 providing a transmit data signal of a first wavelength for transmission on optical fiber 20. Returns of the transmit data signal and a receive data signal of a second wavelength are coupled from optical fiber 20 to receiver 42 through amplifier 35 and detector 26. The receiver 42 provides a receive data stream (not shown) and a signal (referred to herein as "return signal") that is indicative of the OTDR returns from the fiber 20, in response to the output of detector 26. OTDR logic 49 analyzes the return signal to determine if optical fiber 20 has an anomaly. Hence, the device 30 simultaneously communicates data and detects anomalies. European Patent Application, EP 1 884 758, published on Jun. 2, 2008, describes a device similar to that shown by FIG. 2.

Figure 3:
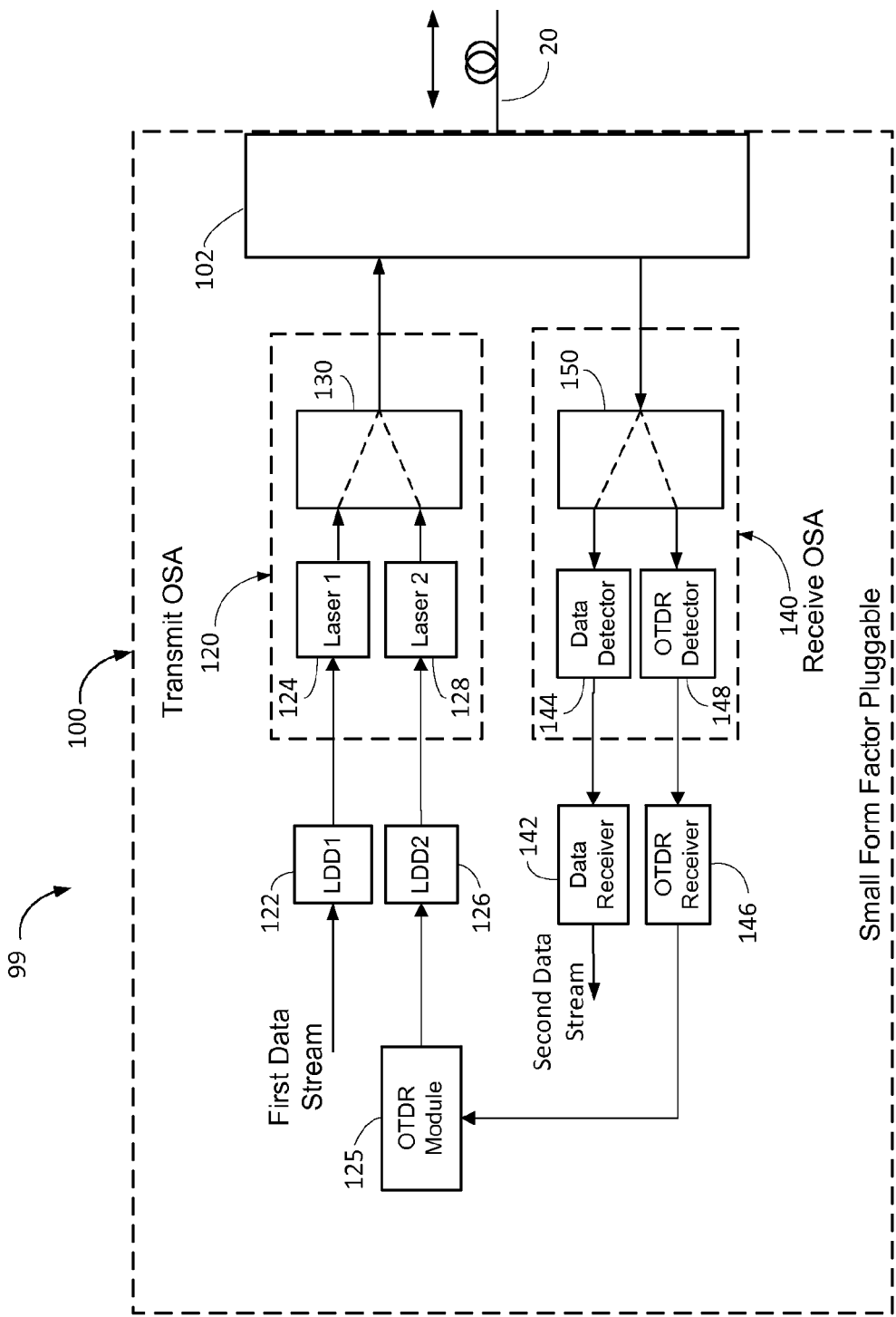
FIG. 3 is a block diagram illustrating an exemplary embodiment of a communication device in accordance with the present disclosure.

An exemplary communication device 99 is depicted in FIG. 3, wherein an SFP package 100 has optical subassemblies and an OTDR module. In other embodiments of the communication device 99 a portion or all of the OTDR device may be outside the SFP package 100. The SFP package 100 simultaneously transfers data over and detects anomalies in optical fiber 20. SFP package 100 has a transmit optical subassembly (OSA) 120 and a receive OSA 140. The transmit OSA 120 has a data laser 124 having its input coupled to a data laser diode driver (LDD) 122 and its output coupled to optical fiber 20. Further, the transmit OSA 120 has an OTDR laser 128 with its input coupled to an OTDR module 125 via OTDR laser diode driver 126 and its output coupled to optical fiber 20. Receive OSA 140 has a data detector 144 and an OTDR detector 148. A wavelength division multiplexer (WDM) 150, such as an optical edge filter, directs a receive signal to the data detector 144 and an OTDR signal to the OTDR detector 148.

Data LDD 122 generates a signal for exciting data laser 124 in response to a first data stream, such as a 2.5 Giga-bits per second (Gbps) data stream. Data laser 124 generates an optical data signal, referred to hereafter as "transmit data signal," at a first wavelength, $\lambda 1$, in response to the output of the data LDD 122, thereby converting the data stream into an optical data signal. OTDR LDD 126 generates a signal for exciting OTDR laser 128 in response to the OTDR data from OTDR module 125. As an example, the OTDR signal may be a Maximum Length Pseudo-random Bit Sequence (M sequence), a pulse, or other type of signal typically used to form OTDR signals for probing a fiber. The OTDR laser 128 generates an optical OTDR signal at a second wavelength, $\lambda 2$, in response to the output of the OTDR LDD 126, thereby converting the OTDR signal into an optical signal. A WDM 130, such as an optical edge filter, combines the transmit data signal from the data laser 124 and the OTDR transmit signal from the OTDR laser 128 thereby providing a signal, referred to hereafter as "combined transmit signal," for transmission across the optical fiber 20. Directional coupler 102 receives and directs the combined transmit signal towards a downstream receiver (not shown). As the combined transmit signal propagates towards the downstream receiver, a portion of such signal is backscattered and reflected to the directional coupler 102.

A far-end transmitter (not shown) transmits a receive data signal of a third wavelength, $\lambda 3$, over fiber 20 towards the SFP device 100. The receive data signal is directed to a WDM 150 via directional coupler 102. The WDM 150, such as an optical edge filter, directs the receive data signal to a data detector 144. That is, the WDM 150 allows light at wavelength $\lambda 3$ to pass to the data detector 144 while blocking from such detector 144 light at wavelengths $\lambda 1$ and $\lambda 2$. In response, the data detector 144 converts the receive data signal from the optical domain to the electrical domain and forwards to data receiver 142 an electrical signal indicative of the receive data signal, and the data receiver 142 recovers a data stream originally transmitted by the far-end transmitter.

In addition to receiving the receive data signal from the fiber 20, the directional coupler 102 also receives returns caused by backscatter and reflection of the combined transmit data signal that is transmitted by the transmit OSA 120. These returns include energy from the transmit data signal at wavelength $\lambda 1$ and from the OTDR transmit signal at wavelength $\lambda 2$. The directional coupler 102 couples the reflected signal to WDM 150, which is configured to block energy at wavelength $\lambda 1$ from propagating to either the OTDR detector 148 or the data detector 144. Specifically, the WDM 150 allows light at wavelength $\lambda 2$ to pass to the OTDR detector 148 while blocking from such detector 148 light at wavelengths $\lambda 1$ and $\lambda 3$. Hence, most of the energy received by OTDR detector 148 is from the returns of the OTDR transmit signal. The OTDR detector 148 converts the returns from the optical domain to the electrical domain. The OTDR receiver 146 is configured to sample the signal from the OTDR detector 148 to provide sample values which define data that are further processed and analyzed by OTDR module 125 for determining whether any anomalies are present along the fiber 20.

In this regard, the OTDR module 125 comprises logic that is configured to detect anomalies by processing and analyzing the defined data along the optical fiber 20 based on returns of an optical OTDR signal that is used to probe the fiber. Such logic can be implemented in hardware, software, firmware, or any combination thereof.

Note that there are various techniques that can be used to detect anomalies based on the samples of the OTDR reflections. In one exemplary embodiment, the OTDR transmit signal transmitted by the OSA 120 across the fiber 20 is a pseudo-random (PN) sequence, such as an M sequence, and the OTDR module 125 correlates (e.g., multiplies and accumulates) the sample values indicative of the optical returns with a delayed version of the transmitted sequence thereby defining correlated values indicative of points along the fiber 20 that upon further analysis may be likely locations of anomalies. In other embodiments, other types of OTDRs may be used. Exemplary embodiments of OTDRs are described in commonly-assigned U.S. patent application Ser. No. 12/783, 999, entitled "Systems and Methods for Unobtrusively Testing Optical Fibers" and filed on May 20, 2010, which is incorporated herein by reference.

The exemplary embodiment shown by FIG. 3 has various advantages that help to maintain adequate isolation between the respective signals. For example, the signals detected by the detectors 144 and 148 have both been attenuated by the fiber 20 thereby facilitating isolation of such signals. Indeed, it is possible to implement the WDM 150 with one or more optical filters, which are relatively easy to manufacture and therefore provide a low-cost isolation method within a miniaturized OSA 140, thereby facilitating fabrication of a low cost SFP device 100 that achieves goods isolation and performance.

Figure 4:
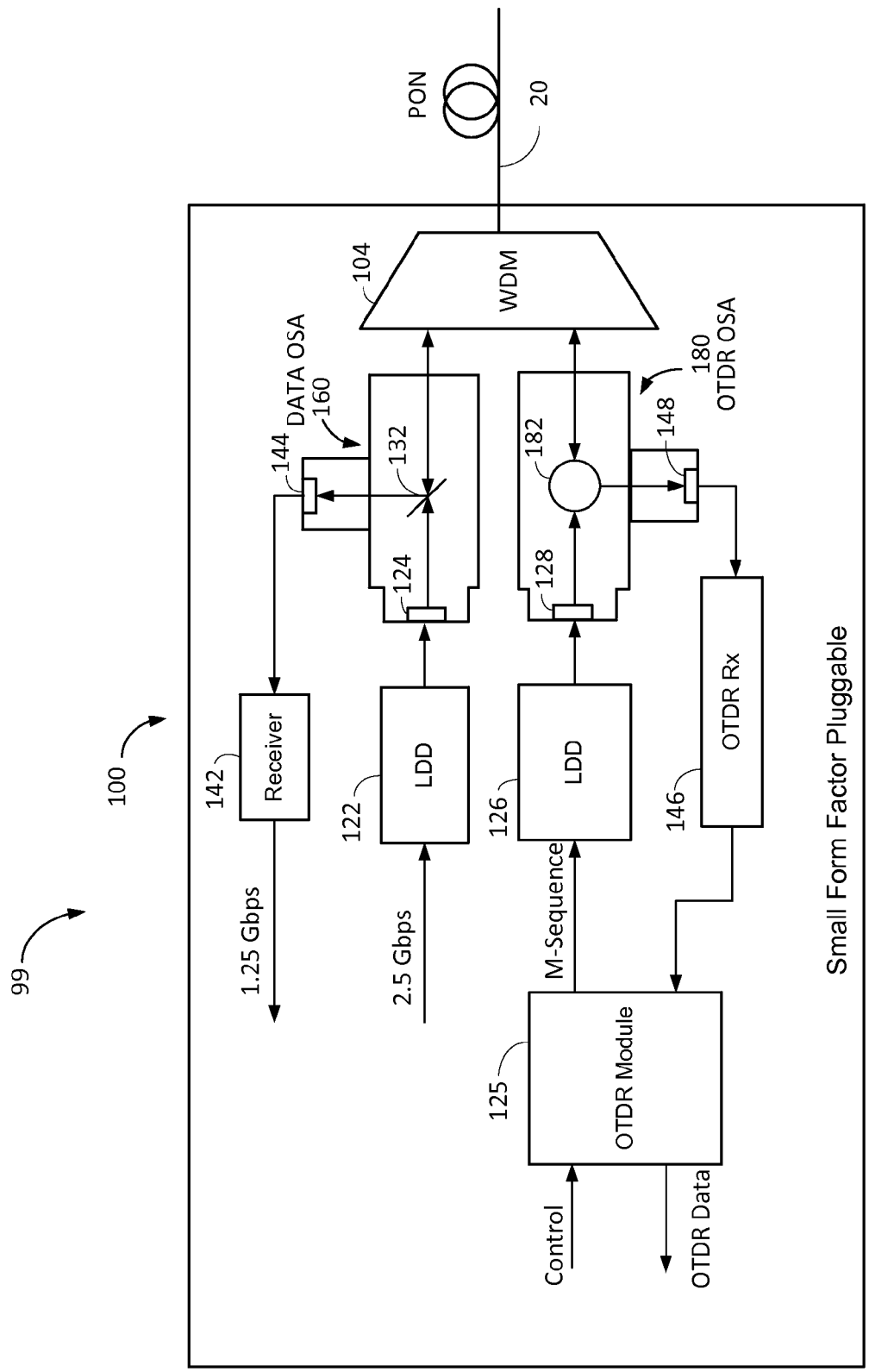
FIG. 4 is a block diagram illustrating another communication device in accordance with the present disclosure.

Another exemplary communication device 99 is depicted in FIG. 4, wherein an SFP package 100 has optical subassemblies and an OTDR module. In other embodiments of the communication device 99, a portion or all of the OTDR module may be outside the SFP package 100. The SFP package 100 simultaneously transfers data over and detects anomalies in optical fiber 20. SFP package 100 includes a data OSA 160 and an OTDR OSA 180. The data OSA 160 is connected to an LDD 122 that generates a driver signal in response to a data stream. The driver signal from LDD 122 is sent to a transmit laser 124. The output of transmit laser 124 is a transmit data signal having a first wavelength, and is coupled to the optical fiber 20 via WDM 132 and WDM 104. A receive data signal at a third wavelength is coupled to a receive detector 144 that converts the receive data signal from the optical domain to the electrical domain, and a data receiver 142 recovers the data stream originally transmitted from a far-end transmitter (not shown) across the fiber 20.

The OTDR OSA 180 has an OTDR laser 128 and an OTDR detector 148. The OTDR module 125 provides an OTDR transmit signal for probing the fiber 20. A LDD 126 receives the OTDR signal and uses it to drive the OTDR laser 128, which converts the OTDR signal from the electrical domain to the optical domain. The optical OTDR signal generated by the laser 128 is coupled to fiber 20 via an OTDR directional coupler 182 and WDM 104. Directional coupler 182, which may be a circulator, is configured to limit the energy in the optical OTDR signal from the laser 128 that is coupled to the OTDR receiver 146. That is, the directional coupler 182 allows light from the laser 128 to pass to the WDM 104 while blocking such light from reaching the detector 148. The optical OTDR signal that passes through the directional coupler 182 to the fiber 20 is backscattered and reflected at various points along the fiber 20 and returns to the directional coupler 182. For such returns, the directional coupler 182 allows the light to pass to the detector 148. The returns, sometimes referred to as "optical OTDR return signals," are converted into the electrical domain by the detector 148 and sampled by the receiver 146 to provide samples that are analyzed by the OTDR module 125 to detect fiber anomalies, as described above.

Note that the WDM 104 is configured to provide isolation between the data OSA 160 and the OTDR OSA 180. In this regard, the WDM 104 allows light at the wavelength of the receive data signal to pass from the fiber 20 to the data OSA 160, thereby allowing the receive data signal from the far-end transmitter (not shown) to reach the detector 144. However, the WDM 104 prevents the OTDR transmit signal and returns from such signal from reaching the data OSA 160. Also, WDM 104 allows light at the wavelength of the OTDR transmit signal to pass from the fiber 20 to the OTDR OSA 160, thereby allowing the returns of the OTDR signal to reach the detector 148. However, the WDM 104 prevents the wavelengths of the transmit data signals communicated by the data OSA 160 and the receive data signal received by the data OSA 160 from reaching the OTDR OSA 180.

Note that in the embodiments described herein various wavelengths can be used. As an example, the laser 124 for each embodiment shown by FIGS. 3 and 4 is configured to transmit light at a wavelength $\lambda 1$ around 1490 nm, the OTDR laser 128 is configured to transmit light at a wavelength $\lambda 2$ around 1550 nm or greater (e.g., 1625 nm), and the receive data signal transmitted by the far-end transmitter (not shown) across the fiber 20 has a wavelength $\lambda 3$ of about 1310 nm. In other embodiments other wavelengths are possible.

Note that the selection of wavelengths where $\lambda 3 < \lambda 1 < \lambda 2$ has various advantages, such as helping to enable the use of simple, low cost components to achieve isolation. For example, in FIG. 3, the WDM 150 for the path to the data detector 144 can be configured to block light at wavelengths above a threshold between $\lambda 3$ and $\lambda 1$. In such case, light at the wavelengths $\lambda 1$ and $\lambda 2$ are blocked while light at $\lambda 3$ is allowed to pass. For the path to the OTDR detector 148, the WDM 150 can be configured to block light at wavelengths below a threshold between $\lambda 1$ and $\lambda 2$. In such case, light at the wavelengths $\lambda 1$ and $\lambda 3$ are blocked while light at $\lambda 2$ is allowed to pass. Such functionality can be achieved via optical edge filters without using more expensive or bulky isolation components.

In addition, it is possible to repurpose certain conventional SFPs, referred to as "compact SFPs," to form the exemplary devices shown by FIGS. 3 and 4. In this regard, a compact SFP generally refers to an SFP constructed with miniaturized components to fit two OSAs in the same SFP package. Traditionally, one OSA is used for communicating across a first fiber connected to the compact SFP, and the other OSA is used for communicating across a second fiber connected to the same compact SFP. In the embodiment shown by FIG. 3, one OSA of a compact SFP can be repurposed to have two lasers: one for transmitting an optical data signal and the other for transmitting an optical OTDR signal. The other OSA of the compact SFP can be repurposed to have two detectors: one for detecting an optical data signal and the other for detecting returns of the optical OTDR signal. In the embodiment shown by FIG. 4, one OSA of a compact SFP can be used to transmit and receive optical data signals similar to conventional compact SFPs. However, the other OSA of the compact SFP can be repurposed to transmit an OTDR signal and to receive its returns. Since the transmitted OTDR signal and the returns are at the same wavelength, a directional coupler 182 is used to separate them inside of the OSA.

Figure 5:
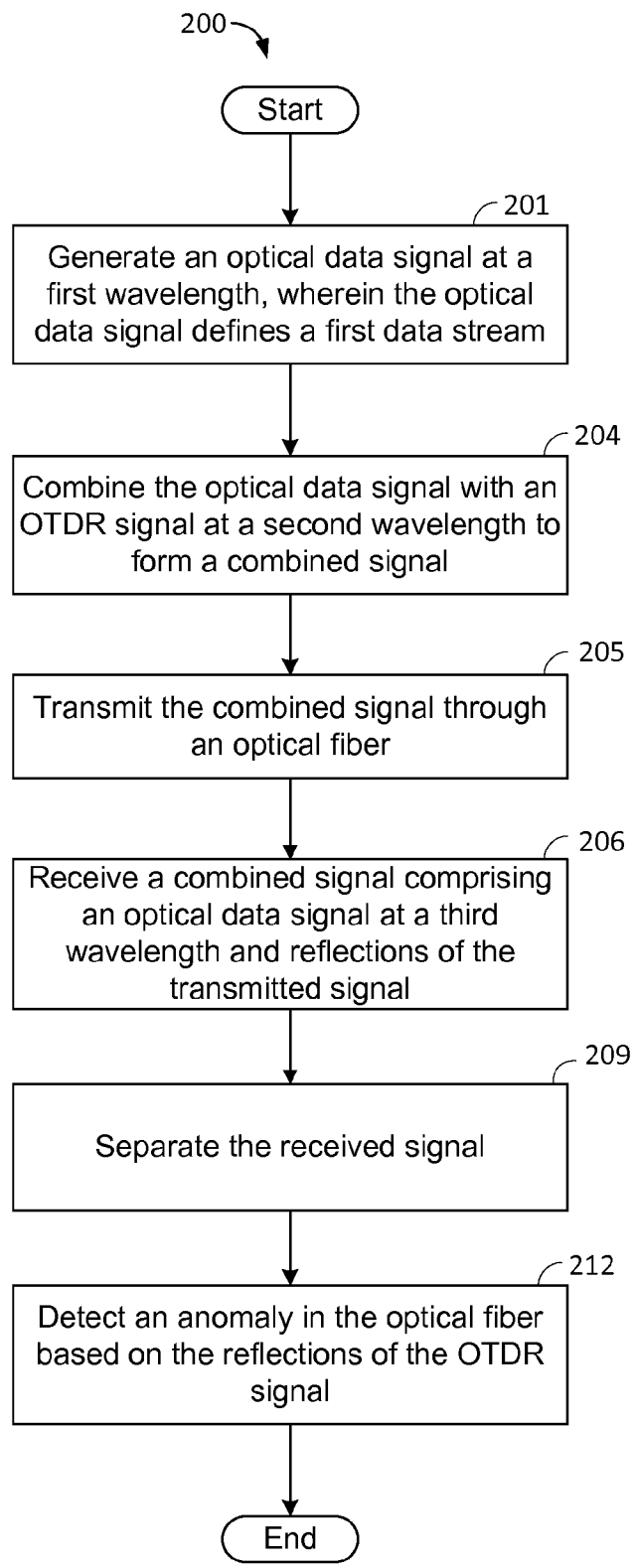
FIG. 5 is a flowchart illustrating an exemplary method for simultaneously sending data and detecting faults in an optical fiber.

An exemplary use and operation of the SFP device 100 shown by FIG. 3 will be described in more detail with particular reference to FIG. 5.

In this regard, the LDD 122 receives a data stream for transmission across the fiber 20 and uses the data stream to drive the laser 124 thereby converting the data stream to an optical data signal at a first wavelength, $\lambda 1$, as shown by block 201. In addition, the LDD 126 receives an OTDR signal from the OTDR module 125 and uses the OTDR signal to drive the laser 128 thereby converting the signal to an optical OTDR signal at a second wavelength, $\lambda 2$. The WDM 130 combines the signals from the lasers 124 and 128 to form a combined signal that is transmitted through the optical fiber, as shown by blocks 204 and 205. Note that the directional coupler 102 prevents the light from the transmit OSA 120 from reaching the receive OSA 140.

As the combined signal propagates through the fiber 20, the signal is backscattered and reflected at various points. The backscatter and reflections arrive at the directional coupler 102 along with an optical data signal at a third wavelength, $\lambda 3$, transmitted from a far-end transmitter (not shown) at an opposite end of the fiber 20. The directional coupler 102 allows light from the fiber 20 to pass to the receive OSA 140, which receives such light, as shown by block 206.

The WDM 150 separates the combined signal received from the fiber 20, as shown by block 209. In this regard, with respect to the data detector 144, the WDM 150 blocks light at the wavelengths λ1 and λ2 allowing light to pass at the wavelength λ3 of the data signal transmitted by the far-end transmitter. Thus, the data signal transmitted by the far-end transmitter is converted to an electrical signal by the detector 144 and received by the receiver 142, which recovers the data stream originally transmitted by the far-end transmitter. In addition, with respect to the OTDR detector 148, the WDM 150 blocks light at the wavelengths λ1 and λ3 allowing light to pass at the wavelength λ2 of the OTDR signal. Thus, the backscatter and reflections of the OTDR signal are converted to an electrical signal by the OTDR photodetector 148 and received by the OTDR receiver 146, which samples such signal. As shown by block 212, the OTDR module 125 correlates the samples with the transmitted signal and determines whether any anomalies exist along the fiber 20 based on the correlated values.

It should be emphasized that the embodiments described above are exemplary, and various changes and modifications to the described embodiments would be apparent to a person of ordinary skill upon reading this disclosure.

Now, therefore, the following is claimed:

1. A communication device having an embedded optical time domain reflectometer (OTDR), comprising:
    a first optical subassembly (OSA) embedded in a small form factor pluggable (SFP) package, the first OSA coupled to an optical fiber and having a first optical transmitter and a second optical transmitter, wherein the first optical transmitter is configured to transmit a first optical data signal at a first wavelength through the optical fiber, and wherein the second optical transmitter is configured to transmit an optical OTDR signal at a second wavelength through the optical fiber;
    a second OSA embedded in the SFP package, the second OSA coupled to the optical fiber and having a first optical detector and a second optical detector, wherein the first optical detector is configured to detect a second optical data signal at a third wavelength from the optical fiber, and wherein the second optical detector is configured to detect returns of the optical OTDR signal from the optical fiber; and
    logic configured to define data indicative of at least one anomaly along the optical fiber based on the returns of the optical OTDR signal.

2. The communication device of claim 1, wherein the logic is embedded in the SFP package.

3. The communication device of claim 1, wherein the logic is configured to detect anomalies along the optical fiber based on the returns.

4. The communication device of claim 1, wherein the second OSA has a wavelength division multiplexer configured to separate the returns from the second optical data signal.

5. The communication device of claim 4, further comprising a directional coupler optically coupled to the first and second OSAs and the optical fiber.

6. The communication device of claim 1, wherein the first OSA has a wavelength division multiplexer configured to combine the first optical data signal and the optical OTDR signal.

7. The communication device of claim 1, wherein the OTDR signal is based on a correlation sequence.

8. The communication device of claim 1, wherein the second wavelength is equal to or greater than 1550 nm.

9. A communication device having an embedded optical time domain reflectometer (OTDR), comprising:
    a first optical subassembly (OSA) embedded in a small form factor pluggable (SFP) package, the first OSA optically coupled to an optical fiber and having a first optical transmitter and a first optical detector, wherein the first optical transmitter is configured to transmit a first optical data signal at a first wavelength through the optical fiber, and wherein the first optical detector is configured to detect a second optical data signal at a second wavelength from the optical fiber;
    a second OSA embedded in the SFP package, the second OSA optically coupled to the optical fiber and having a second optical transmitter and a second optical detector, wherein the second optical transmitter is configured to transmit an optical OTDR signal at a third wavelength through the optical fiber, wherein the second optical detector is configured to detect returns of the OTDR signal from the optical fiber, and wherein the second OSA has a directional coupler optically coupled to the second optical transmitter and the second optical detector; and
    logic configured to define data indicative of at least one anomaly along the optical fiber based on the returns of the OTDR signal.

10. The communication device of claim 9, wherein the logic is embedded in the SFP package.

11. The communication device of claim 9, wherein the logic is configured to detect anomalies along the optical fiber based on the returns of the OTDR signal.

12. The communication device of claim 9, wherein the first OSA has a wavelength division multiplexer optically coupled to the first optical transmitter and the first optical detector.

13. The communication device of claim 9, wherein the second wavelength is less than the first wavelength, and wherein the first wavelength is less than the third wavelength.

14. A method for use in a communication device having an embedded optical time domain reflectometer (OTDR), comprising:
    transmitting a first optical data signal through an optical fiber at a first wavelength from a first optical subassembly (OSA) embedded in a small form factor pluggable (SFP) package;
    transmitting an optical OTDR signal at a second wavelength from the first OSA through the optical fiber;
    receiving a second optical data signal at a third wavelength from the optical fiber;
    detecting the second optical data signal via a second OSA embedded in the SFP package;
    detecting returns of the optical OTDR signal via the second OSA; and
    detecting an anomaly along the optical fiber based on the returns.

15. The method of claim 14, further comprising separating the returns of the optical OTDR signal from the second optical data signal via a wavelength division multiplexer in the second OSA.

16. The method of claim 14, wherein the optical OTDR signal is based on a correlation sequence.

* * * * *